United States Patent [19]

Urayama

[11] 3,933,648

[45] Jan. 20, 1976

[54] SCREENING APPARATUS

[75] Inventor: Kiyoshi Urayama, Kyoto, Japan

[73] Assignee: Kabushiki Kaisha Hosokawa Funtai Kogaku Kenkyusho, Osaka, Japan

[22] Filed: Oct. 23, 1973

[21] Appl. No.: 408,750

[30] Foreign Application Priority Data

Oct. 25, 1972 Japan .............................. 47-106995

[52] U.S. Cl. ................ 210/355; 210/388; 210/405; 210/410; 210/DIG. 18

[51] Int. Cl.[2] ........................................... B01D 35/20

[58] Field of Search ........... 210/354, 355, 405, 410, 210/407, 384, 388, DIG. 18, 411, 412; 209/282, 321, 273

[56] References Cited

UNITED STATES PATENTS

| | | | |
|---|---|---|---|
| 943,708 | 12/1909 | Roake | 210/354 X |
| 969,364 | 9/1910 | Grootenhuis | 210/354 |
| 2,958,655 | 11/1960 | Brown | 210/388 X |
| 3,326,383 | 6/1967 | Pranovi | 210/407 |
| 3,409,125 | 11/1968 | Bezemer et al. | 209/273 X |
| 3,581,893 | 6/1971 | Rick | 210/412 X |
| 3,816,176 | 6/1974 | Rundquist | 210/411 |

FOREIGN PATENTS OR APPLICATIONS

| | | | |
|---|---|---|---|
| 215,444 | 5/1956 | Australia | 210/405 |

*Primary Examiner*—John Adee
*Attorney, Agent, or Firm*—Edwin E. Greigg

[57] ABSTRACT

A screening apparatus comprising a water receptacle, a screen frame mounted on the water receptacle with a screen covering the opening of the water receptacle, a sprinkler for sprinkling water into the screen frame and a vibrator for expanding and contracting air within the water receptacle to thereby vibrate the screen.

4 Claims, 2 Drawing Figures

SCREENING APPARATUS

BACKGROUND OF THE INVENTION

The present invention relates to a screening apparatus comprising means for sprinkling liquid into a screen frame having a screen and means for vibrating the screen.

Screening apparatuses of this type, called wet-type screening apparatuses, have been provided to overcome the drawback of inefficient screening operation experienced with apparatuses of the dry type in which the screen is merely vibrated.

The conventional screening apparatus of the wet type includes a screen frame supported in suspension to subject the screen to horizontal oscillations. Such apparatus has the following drawbacks:

1. The swinging motion of the screen causes the water retained in the screen frame to move in horizontal directions therein, with the result that powdery or granular material fails to spread over the screen uniformly, making it impossible to achieve highly efficient and accurate screening operation.

2. Inasmuch as the screen can not sufficiently vibrate relative to the screen frame, with oscillations taking place in horizontal directions, particles or granules trapped in the meshes of the screen are almost unable to rollingly move upward or downward, hence still inefficient operation.

To overcome these drawbacks, this invention provides improvements in the wet-type screening apparatus.

SUMMARY OF THE INVENTION

The screening apparatus of this invention comprises a screen frame having a screen, a housing for mounting the screen frame, the housing having an opening communicating with the meshes of the screen in the screen frame mounted thereon, means for supplying a liquid into the screen frame mounted on the housing, and means for alternately expanding and contracting air within the housing to thereby vibrate the screen relative to the screen frame in directions substantially perpendicular to the plane of the screen.

Briefly, the apparatus of this invention is characterized in that the air within a space below the screen is expanded and contracted alternately to vibrate the screen utilizing the expansion and contraction of the air.

Accordingly, there is no need to vibrate the screen frame in order to vibrate the screen but the screen itself is vibrated in directions substantially perpendicular to its plane, making it less likely that the remaining liquid in the screen frame will move in horizontal directions and consequently permitting powdery or granular material to be screened while being spread almost uniformly over the entire surface of the screen all the time. Thus screening operation can be carried out more efficiently and accurately than with conventional wet-type screening apparatuses.

Since the screen is adapted to be vibrated in a direction substantially perpendicular to its plane, the powdery or granular material becomes suspended in liquid retained in the screen frame, while particles or granules which tend to clog up the meshes of the screen are rollingly moved and agitated, being thereby dispersed in the remaining liquid in the screen frame. The screen therefore achieves improved efficiency.

Accordingly the primary object of this invention is to provide a wet-type apparatus for screening efficiently and accurately.

Another object of this invention is to provide an apparatus capable of keeping powdery or granular material distributed almost uniformly over the entire surface of the screen.

Still another object of this invention is to provide an apparatus suitable for screening operation on a large scale.

Other objects and advantages of this invention will become apparent from the following description.

DESCRIPTION OF THE PREFERRED EMBODIMENTS

Figure 1:
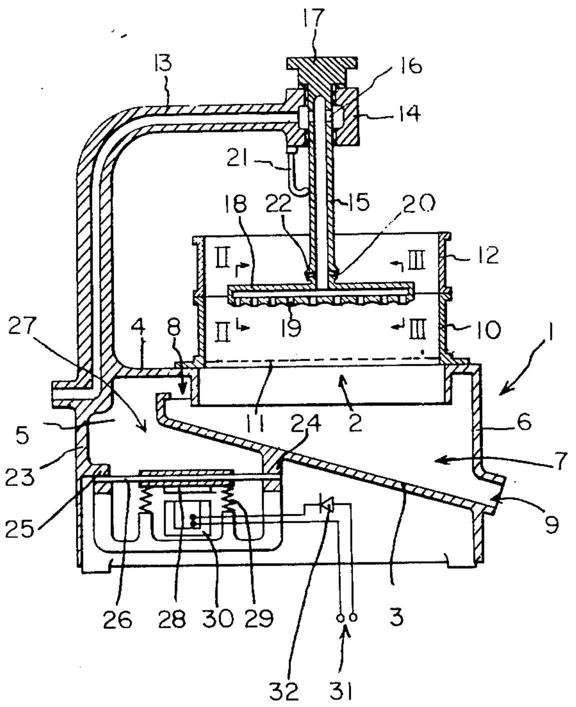
FIG. 1 is a view in vertical section showing an embodiment of this invention.

A base frame 1 is formed in its top with an opening 2, below which there is disposed a downwardly inclined plate 3. A housing 7 comprises the upper shelf portion 4, front and rear side walls 5 and right side wall 6 of the base frame 1 and the inclined plate 3 and has openings 8 and 9 at the upper and lower ends of the inclined plate 3 respectively.

The opening 2 in the top of the base frame 1 is circular and has a diameter slightly greater than the diameter of a circular screen 11 attached to a cylindrical screen frame 10. Accordingly, the opening 2 of the base frame 1 communicates with all the meshes of the screen 11. Mounted on the screen frame 10 is an upper frame 12 having approximately the same size and shape as the screen frame 10 to prevent splashing of water supplied into the screen frame 10.

Figure 2:
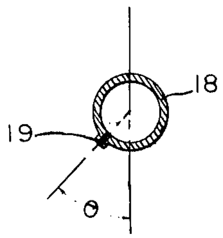
FIG. 2 is a view in section taken along the line II—II in FIG. 1.

A bent pipe 13 secured to the base frame 1 has at its distal end a bearing member 14 the interior of which communicates with the pipe 13. The bearing member 14 supports a rotary pipe 15 rotatable about a vertical axis which almost coincides with the center axis of the opening 2 in the top of the base frame 1. By way of a plurality of apertures 16 formed in the rotary pipe 15, the rotary pipe 15 internally communicates with the bearing member 14. The rotary pipe 15 is closed at its upper end which is provided with a handle 17. Through the engagement of the handle 17 with the bearing member 14, the rotary pipe 15 is suspended from and supported by the bearing member 14. The rotary pipe 15 carries at its lower end a horizontal pipe 18 having a substantially horizontal axis and internally communicating with the pipe 18. The horizontal pipe 18 is equipped with a plurality of nozzles 19 which are spaced apart equidistantly. The nozzles 19 positioned on the left side of the axis of the rotary pipe 15 are oriented in opposite relation to those positioned on the right side with respect to the jetting direction. More specifically as illustrated in FIG. 2, each of the nozzles 19 has its jetting direction inclined, circumferentially of the horizontal pipe 18, at an angle of $\theta$ (45°) with respect to a vertical line, so that when water is supplied by means, not shown, to the bent pipe 13, the jet of water from the nozzles 19 produces a reaction force, which rotates the rotary pipe 15 and the horizontal pipe 18. By sprinkling water with revolving nozzles 19 during screening operation in this way, the water can be applied to the screen 11 almost uniformly over the entire surface thereof to improve the efficiency and accuracy of the operation. The rotary pipe 15 is also provided, toward its lower end, with a plurality of nozzles 20 for sprinkling water. The water sprinkled into the screen frame 10 passes downward through the meshes of the screen 11 with undersize powdery or granular material, flows down on the inclined plate 3 and is discharged from the housing 7 through the opening 9 at the lower end of the inclined plate 3.

The bearing member 14 has a hook 21 for engagement with an annular projection 22 on the rotary pipe 15, whereby the rotary pipe 15 can be retained at the elevated position so that the screen frame 10 can be handled without being hindered by the rotary pipe 15 and horizontal pipe 18 when being mounted on the base frame 1.

An air chamber 27 is defined by the upper wall 4, front and rear side walls 5 and left side wall 23 of the base frame 1, the inclined plate 3 and an airtight flexible diaphragm 26 extending from a rib 24 beneath the inclined plate 3 to another rib 25 on the left side wall 23. The air chamber 27 communicates with the housing 7 through the opening 8 at the upper end of the inclined plate 3 of the housing 7. The diaphragm 26 has a highly magnetic member 28 which is pushed up by a plurality of compression springs 29 attached to the base frame 1. Disposed below the magnetic member 28 is an electromagnet 30 mounted on the base frame 1 and connected to an A.C. supply source 31 by a circuit including a half-wave rectifier 32. Current is therefore applied to the electromagnet 30 intermittently. Consequently, by virtue of depression by the electromagnet 30 and elevation by the compression spring 29, the highly magnetic member 38 undergoes vibration having a small amplitude and short period, causing expansion and contraction of air within the air or pulsation chamber 27. The energy of the expansion and contraction is transmitted to the air within the housing 7 which air in turn undergoes expansion and contraction, this bringing the screen 11 into vibration relative to the screen frame 10 in a direction substantially perpendicular to the plane of the screen 11. As a result, the apparatus performs the screening operation more efficiently and more accurately than conventional apparatuses as already described in detail.

Since satisfactory results can be produced only by vibrating the screen 11 through the expansion and contraction of air within the housing 7 according to this invention, the housing 7 may have the opening 9 for discharging water. However, the water discharge opening 9 may alternatively be closed with a valve or watertight trap so that the screen 11 can be vibrated when used in a large apparatus, or the screen 11 may be so adapted that air will pass through the meshes of screen 11 upward and downward.

Further according to this invention, it is advantageous to provide the housing 7 and air chamber 27 separately as in the foregoing embodiment in order to prevent the suspension flowing through the screen 11 from entering the chamber 27. However, the diaphragm 26 may alternatively be positioned in the housing 7 to directly expand and contract the air within the housing 7. Various known means are also employable to cause the air in the housing 7 to expand and contract alternately.

Conveniently, the water may contain for example a suitable dispersing agent added thereto to promote dispersion of powdery or granular material into water and to thereby ensure screening operation with improved efficiency. Furthermore, powdery or granular material may previously be mixed with water or solution to prepare a suspension, which may then be fed onto the screen 11.

The means for supplying water, solution, suspension or like liquid into the screen frame 10 mounted on the housing 7 may be, for example, stationary nozzles which are spaced apart and arranged over the almost entire area of the screen 11. The screen 11 may be inclined, with nozzles positioned above the inclined screen. The present invention can further be embodied in the form of various other modifications.

The apparatus according to this invention are usable for experimental purposes as well as for industrial operations.

What I claim is:

1. In a screening apparatus, the combination comprising:

- housing means provided with horizontal shelf portion means;
- means defining an opening in said shelf portion means;
- open ended frame means disposed about said means defining an opening;
- said frame means extending upwardly therefrom;
- screen means disposed at the lower end of said frame means and adapted to cover said means defining the opening;
- means for supplying liquid to said screen from a position above said screen means;
- plate means disposed below said screen means and inclined relative to said screen means to provide a drainage conduit for said liquid; and
- air pulsation means disposed below and protected by said plate means, said pulsation means communicating with said screen means by an outlet above said plate means but below said screen means.

2. In a screen apparatus as described in claim 1, in which said means for supplying liquid includes a plurality of nozzles revolvable by the reaction force of the flow of liquid from said means.

3. In a screening apparatus as described in claim 1, in which said air pulsation means comprises spring biased magnetic diaphragm means actuated by an intermittently energized electromagnet.

4. In a screening apparatus as described in claim 1 in which said means for supplying liquid is upwardly translatable thereby providing access to said frame and screen means.

* * * * *